US008208572B2

(12) United States Patent
Dounaev et al.

(10) Patent No.: US 8,208,572 B2
(45) Date of Patent: Jun. 26, 2012

(54) METHOD FOR TRANSMITTING AND RECEIVING QUADRATURE AMPLITUDE MODULATION SIGNALS, A SYSTEM FOR CARRYING OUT SAID METHOD, A MACHINE-READABLE CARRIER AND THE USE OF A METHOD FOR SYNCHRONOUSLY RECEIVING QUADRATURE AMPLITUDE MODULATION SIGNALS

(75) Inventors: Igor B. Dounaev, Khimki (RU); Leonid A. Letunov, Gomel (BY); Alexander V. Grigoriev, Gomel (BY)

(73) Assignee: Igor Borisovich Dounaev, Moscow District (RU)

( * ) Notice: Subject to any disclaimer, the term of this patent is extended or adjusted under 35 U.S.C. 154(b) by 250 days.

(21) Appl. No.: 12/651,518

(22) Filed: Jan. 4, 2010

(65) Prior Publication Data
US 2010/0177835 A1 Jul. 15, 2010

Related U.S. Application Data

(63) Continuation of application No. PCT/RU2008/000404, filed on Jun. 30, 2008.

(30) Foreign Application Priority Data

Jul. 4, 2007 (RU) .................................. 2007125231

(51) Int. Cl.
*H04L 27/36* (2006.01)
(52) U.S. Cl. ......................... 375/261; 375/260; 375/298
(58) Field of Classification Search .................... 375/261
See application file for complete search history.

(56) References Cited

U.S. PATENT DOCUMENTS

| 5,315,100 A * | 5/1994 | Kobayashi et al. ........ 250/208.1 |
| 6,240,142 B1 * | 5/2001 | Kaufman et al. ............. 375/261 |
| 6,697,440 B1 * | 2/2004 | Shiraishi et al. .............. 375/329 |

(Continued)

FOREIGN PATENT DOCUMENTS

JP 2001237908 A 8/2001
(Continued)

OTHER PUBLICATIONS

International Search Report, mailed Dec. 4, 2008, from International Application No. PCT/RU2008/000404, filed Jun. 30, 2008.

(Continued)

*Primary Examiner* — Chieh M Fan
*Assistant Examiner* — Santiago Garcia
(74) *Attorney, Agent, or Firm* — Houston Eliseeva LLP (57) ABSTRACT

The invention relates to signal transmission. The use of the invention for transmitting and receiving quadrature amplitude modulation signals on unlicensed frequency bands makes it possible to lower a demodulation threshold owing to a low synchronization threshold. The inventive method consists in extending a burst of M m-level quadrature amplitude modulation signals with the aid of two pseudo-random sequences, one of which is periodically inverted in some bursts, thereby making it possible to extract, on a receiving side, the quadrature amplitude modulation signal components corresponding to a meander signal of the pseudo-random sequence inversion (the frequency of which is known). The inventive method is carried out by means of a corresponding system in a hardware and software mode. Moreover, said method can be used for synchronizing the reception of quadrature amplitude modulation signals.

12 Claims, 5 Drawing Sheets

U.S. PATENT DOCUMENTS

| | | | | |
|---|---|---|---|---|
| 6,717,462 | B2* | 4/2004 | Loheit et al. | 329/304 |
| 6,727,772 | B2* | 4/2004 | Kravtsov | 332/103 |
| 7,983,630 | B2* | 7/2011 | Seo et al. | 455/91 |
| 8,027,394 | B2* | 9/2011 | Nicolas | 375/260 |
| 2004/0022328 | A1* | 2/2004 | Laamanen et al. | 375/316 |
| 2005/0111601 | A1* | 5/2005 | Bock | 375/354 |
| 2009/0122912 | A1* | 5/2009 | Dounaev et al. | 375/298 |

FOREIGN PATENT DOCUMENTS

| | | |
|---|---|---|
| JP | 2005117366 A | 4/2005 |
| JP | 2005217636 A | 8/2005 |
| JP | 2006262494 A | 9/2006 |
| RU | 2198470 C1 | 2/2003 |
| RU | 2216874 C2 | 11/2003 |
| RU | 2286025 C1 | 10/2006 |
| WO | 2006135275 A2 | 12/2006 |

OTHER PUBLICATIONS

English translation of International Preliminary Report on Patentability, dated Feb. 9, 2010, from International Application No. PCT/RU2008/000404, filed Jun. 30, 2008.

* cited by examiner

METHOD FOR TRANSMITTING AND RECEIVING QUADRATURE AMPLITUDE MODULATION SIGNALS, A SYSTEM FOR CARRYING OUT SAID METHOD, A MACHINE-READABLE CARRIER AND THE USE OF A METHOD FOR SYNCHRONOUSLY RECEIVING QUADRATURE AMPLITUDE MODULATION SIGNALS

RELATED APPLICATIONS

This application is a Continuation of International Application No. PCT/RU2008/000404, filed Jun. 30, 2008, which claims priority to Russian Patent Application No. RU 2007125231 filed Jul. 4, 2007, both of which are incorporated herein by reference in their entirety.

FIELD OF THE INVENTION

This invention relates to the signal transmission technique. Specifically, this invention relates to the method and system for transmitting and receiving quadrature-amplitude modulation signals meant for preferred use in the non-licensed frequency ranges.

BACKGROUND OF THE INVENTION

In transmitting and receiving the signals modulated in one or another manner, a very important characteristic is the demodulation threshold, i.e., the ratio of the signal power to the noise power (signal-to-noise ratio, SNR), at which the carrier wave of the signal being received ceases to be derived, which results in loss of the reception. The demodulation threshold depends essentially on the demodulation type employed at the transmission side, and the noiseless coding type.

One of possible techniques for lowering the demodulation threshold consists in enlarging a spectrum of the signal being transmitted using the so called pseudo-random sequences (PRS). Particularly, the use of the signals like the PRS is directly specified in radio communication systems operating in those frequency ranges which do not require for licensing the right of exclusive use of one or another part thereof (i.e., in the ranges of 2.400 to 2.483 MHz and of 5.725 to 5.850 MHz). Beside this, requirements for using a frequency separation, for limiting a radiation power (maximum 100 mW in any direction), and for employing normalized frequency band of the radiated signal depending on the PRS base. The PRS base is a repetition cycle thereof expressed in the length intervals of one element of the PRS. For the above ranges, the PRS base should be not less than 10.

In the modems produced at the present time and intended for operating in the above frequency ranges, the modulation of the type QPSK is used, which PRS base is equal to 15.

In these modems which sensitivity ranges from −90 to −98 dBm, the carrier and clock synchronization takes place at the signal-to-noise ratio from 0 to +3 dB, which is caused by a non-linear synchronization circuit. Should the synchronization circuit in these modems is linear, the sensitivity thereof could be improved by 7-10 dB.

Known are various proposals for increasing the demodulation threshold.

Thus, the Japan Laid-open Application No. 2001-237908 (2001 Aug. 31) discloses a system for extracting a synchronization signal from the QAM signal, which system ensures a quasi-synchronous detection. The U.S. Pat. Nos. 6,717,462 (2004 Apr. 6) and 6,727,772 (2004 Apr. 27) disclose methods and systems for transmitting and receiving the QAM signals with a carrier frequency adjustment. However, both these patents provide only a simple processing of the common QAM signal, which does not permit to lower the demodulation threshold.

The US Patent Applications Nos. 2004/0022328 (2004 Feb. 5) and 2005/0111601 (2005 May 26) disclose systems and methods for transmitting quadrature-amplitude modulation (QAM) signals, where the receiver synchronization is based on determining a rotation angle of the received signal vector in the phase space of the complex coordinates. However, these systems employ non-linear techniques of synchronization.

The Japan Laid-open Applications Nos. 2005-117366 (2005 Apr. 28), 2005-217636 (2005 Aug. 11) and 2006-262494 (2006 Sep. 28) disclose QAM methods and systems, where additional specific symbols are introduced for the synchronization at the transmitting side, and the synchronization adjustment is performed at the receiving side using these symbols. Similar principle is used in the International Application WO 2006/135275 (2006 Dec. 21). However, the use of the additional symbols complicates the processing of the received signal.

SUMMARY OF THE INVENTION

The object of the present invention consists in providing such method and system for transmitting and receiving QAM signals, which permit to lower the demodulation threshold by means of providing a low synchronization threshold.

In order to accomplish such a result, provided are a method and system for implementing thereof, both intended for transmitting and receiving QAM signals according to the present invention. The main principle of this invention consists in enlarging the burst of M m-level QAM symbols with two pseudorandom sequences (PRSs), one of which being periodically inverted in some bursts. Owing to this, at the receiving side, the QAM signal components corresponding to the meander signal of the PRS inversion (which frequency is known) are derived. This ensures the ambiguity deletion in adjusting the synchronization frequency at the receiving side.

Detailed aspects and features of the present invention are set forth in the appended claims. The detailed specification serves for better understanding the claimed group of the inventions.

The above and other features of the invention including various novel details of construction and combinations of parts, and other advantages, will now be more particularly described with reference to the accompanying drawings and pointed out in the claims. It will be understood that the particular method and device embodying the invention are shown by way of illustration and not as a limitation of the invention. The principles and features of this invention may be employed in various and numerous embodiments without departing from the scope of the invention.

BRIEF DESCRIPTION OF THE DRAWINGS

In the accompanying drawings, reference characters refer to the same parts throughout the different views. The drawings are not necessarily to scale; emphasis has instead been placed upon illustrating the principles of the invention. Of the drawings.

DETAILED DESCRIPTION OF THE PREFERRED EMBODIMENTS

Figure 1A:
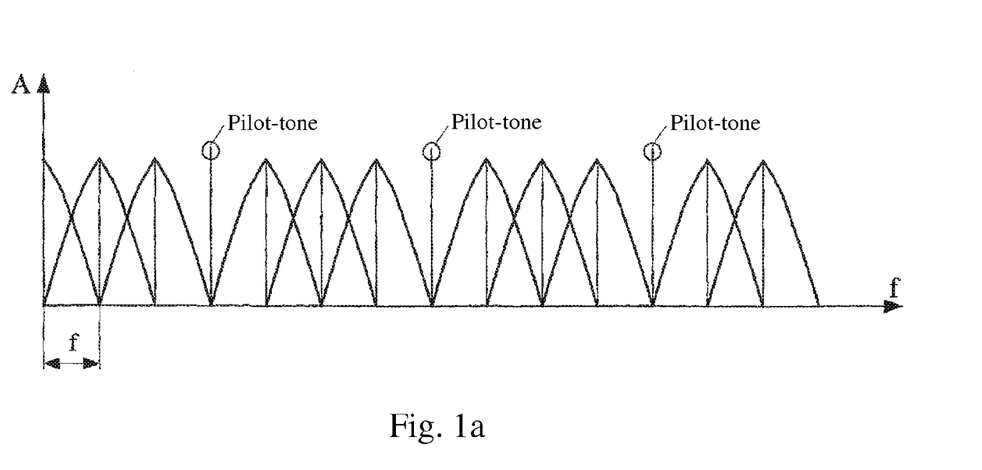
FIG. 1 shows a possible signal used in the system according to the present invention.
Figure 1B:
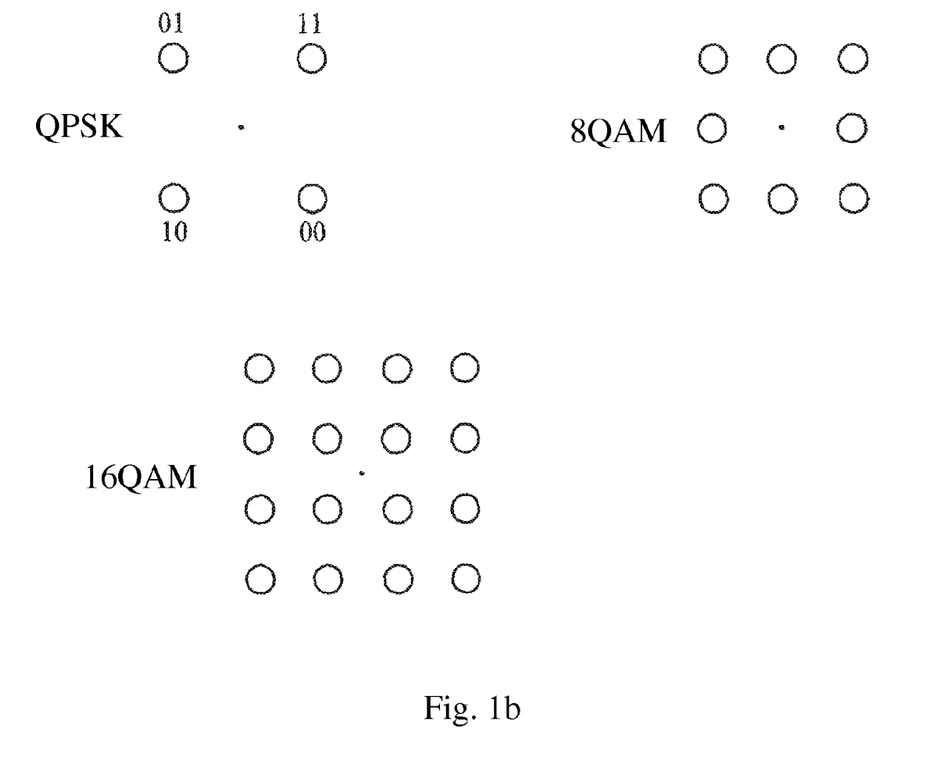

The form of the signal used in the system for transmitting and receiving the QAM signals according to the present invention is shown in FIG. 1. The spectrum of this signal in the I (In-phase) channel is a set of frequency components spaced apart at a predetermined frequency value and interleaved with pilot signals (FIG. 1a). Taking into account the signal in the Q (Quadrature) channel, possible signal constellations for various modulation types are shown in FIG. 1b.

The system for transmitting and receiving QAM signals according to the present invention consists generally of a transmitting side and a receiving side connected with a communication channel.

Figure 2:
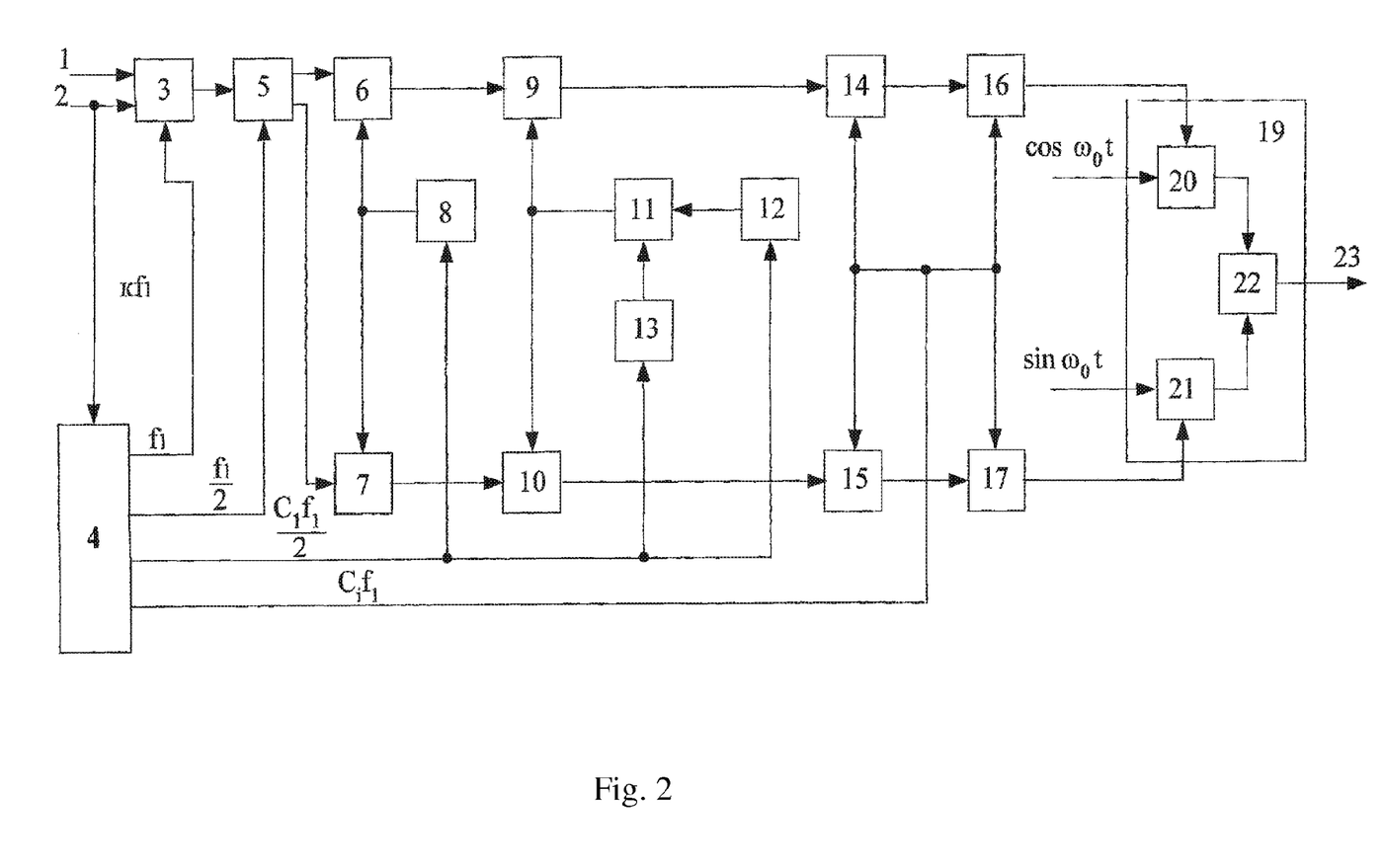
FIG. 2 is the block diagram of the transmitting side of the system for transmitting and receiving QAM signals according to the present invention.

FIG. 2 represents a block diagram of the transmitting side of the system for transmitting and receiving QAM signals according to the present invention.

The transmitting side comprises a m-level symbol former 3 configured for converting the initial information sequence 1 of bit symbols coming at a clock frequency $kf_1$ 2 into a sequence of m-level symbols, where $m=2^k$, $k=2, 3, \ldots$, which m-level symbols coming out at the first clock frequency $f_1$. This first clock frequency is generated in a clock frequency former 4 at the transmitting side, at the first output of this clock frequency former 4, from the clock frequency $kf_1$ signal 2 coming at the input thereof, which signal 2 accompanies the bit symbol sequence 1.

A channel divider 5 is configured for dividing the information sequence of the m-level symbols from the m-level symbol former 3 into the I channel of the transmitting side and Q channel of the transmitting side. The repetition frequency of the m-level symbols in each of the I and Q channels of the transmitting side being equal to $f_1/2$ is generated at the second output of the clock frequency former 4.

Each of first and second multipliers 6 and 7 is configured for multiplying the values of the m-level symbols in the I and Q channels of the transmitting side, respectively, by a signal of pseudo-random sequence (PRS). This signal of the first PRS is generated in a first PRS former 8, so that every even member of that first PRS has one of the values +1 or −1, and all odd members thereof are equal to 0. Herewith, the base of the first PRS is equal to $C_1 \geqq 10$, and the repetition frequency of the first PRS is equal to $C_1 \cdot f_1/2$.

Due to multiplying the values of the m-level symbols by the signal of the first PRS in the multipliers 6 and 7, a spectrum of each of the m-level symbols is enlarged (or widened) by a factor of $C_1$.

Each of first and second adders 9 and 10 is configured for summing signals of the first and second multipliers, respectively, with a signal at an output of manipulator 11 configured for keying (multiplying by the meander, inverting) a signal from a second PRS former 12.

The second PRS former 12 is configured for generating the second PRS having a time base $C_2 \gg C_1$, but the same frequency $C_1 \cdot f_1/2$ as the first PRS from the former 8. In so doing, every even member of the second PRS has one of the values +A or −A, and all odd members thereof are equal to 0.

A meander signal former 13 generates the meander signal having a period twice as much as the period of the second PRS, i.e., the frequency of this meander signal is equal to the value $C_1 \cdot f_1/2C_2$. This meander signal comes to the manipulator 11. As a result, the signs of all even members in the second PRS alter periodically.

Such second PRS inverted periodically is summed in the adders 9 and 10 with the signals from the corresponding multipliers 6 and 7 in the I and Q channels, respectively.

The first PRS former 8, the second PRS former 12, and the meander signal former 13 are clocked with the frequency $C_1 \cdot f_1/2$ coming from a third output of the clock frequency former 4.

Each of first and second digital filters 14 and 15 are configured for filtering the signals from the corresponding adders 9 and 10. This filtering step is performed with the clock frequency $C_1 \cdot f_1$ from a fourth output of the clock frequency former 4. It should be noted that the amplitude-frequency characteristic of both those digital filters 14 and 15 has the cutoff frequency equal to the Nyquist frequency.

First and second digital-to-analog converters (DACs) 16 and 17 are configured for converting the signals from the first and second digital filters 14 and 15, respectively, into analog signals. The operation of the first and second DACs 16 and 17 is clocked with the same frequency $C_1 \cdot f_1$ as the operation of the digital filters 14, 15.

A transmission signal former 19 is configured for forming the transmission signal from the signals of the first and second DACs 16, 17. Within the former 19, a third and fourth multipliers 20, 21 perform multiplication of the signals from the first and second DACs 16, 17, respectively, by a cosine and sine signals (quadrature components) of the carrier frequency and summation of the results of this multiplication in an summing unit 22. A signal from the output of the summing unit 22 in the former 19 is the transmission signal 24 which is supplied into the communication channel (not shown).

Figure 3:
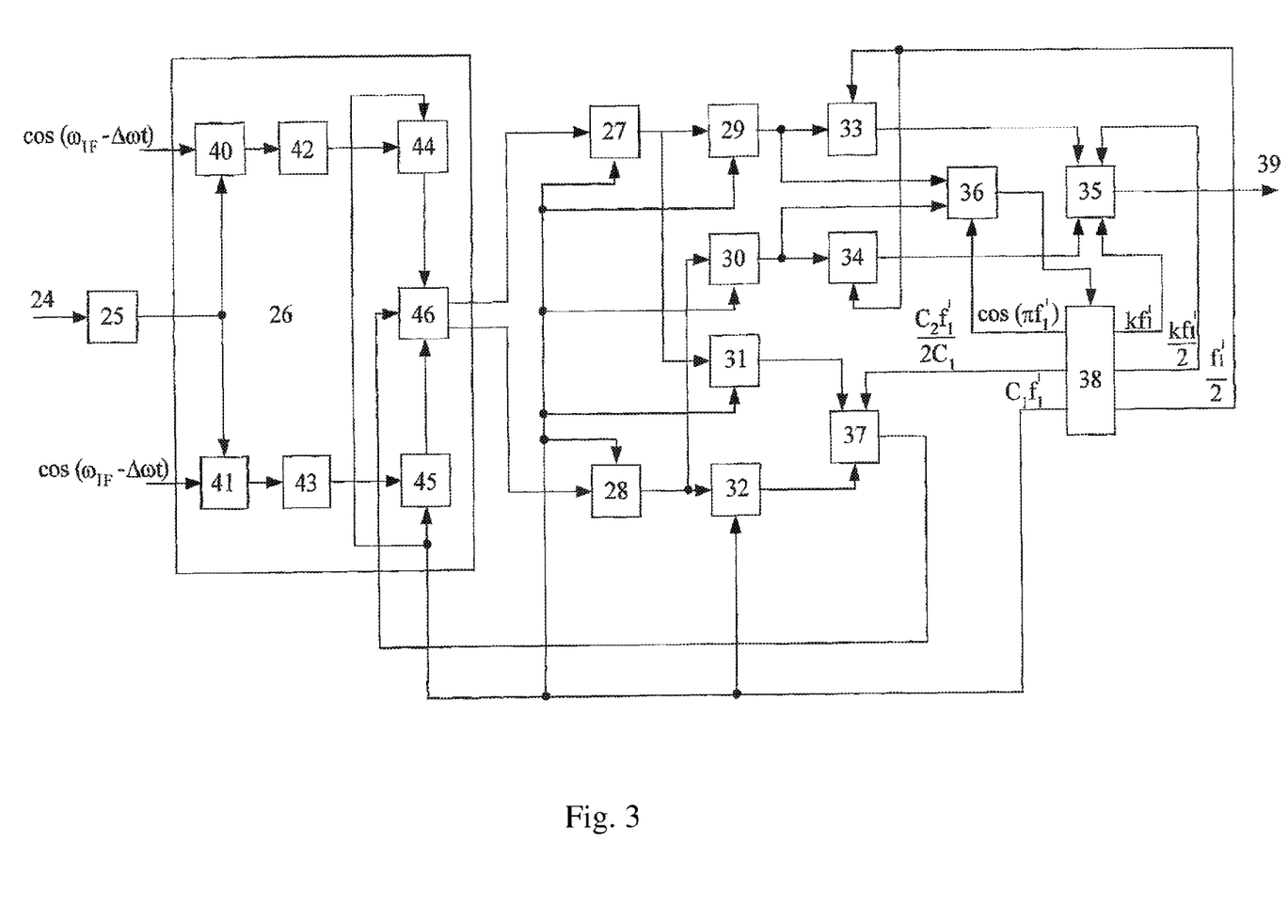
FIG. 3 is the block diagram of the receiving side of the system for transmitting and receiving QAM signals according to the present invention.

FIG. 3 represents a block diagram of the receiving side in the system for transmitting and receiving QAM signals according to the present invention.

The receiving side, which input is connected to the communication channel, comprises conventional—for any receiver—amplifying, filtering and down-converting means, which are shown in FIG. 3 as a unit 25 for transferring to the intermediate frequency (IF). Further, the receiving side comprises a digital quadrature-amplitude demodulation unit 26 configured for dividing the received signal into a I channel signal of the receiving side and a Q channel signal of the receiving side and for performing the quadrature-amplitude demodulation of these signals. The receiving side includes also a clock frequency extractor 38 configured for extracting the clock frequencies using the signals in the I and Q channels of the receiving side. The embodiment of the clock frequency extractor 38 will be shown below.

The digital quadrature-amplitude demodulation unit 26 comprises a fifth and sixth multipliers 40 and 41, each configured for multiplying the input signal transferred onto the intermediate frequency by the respective quadrature (i.e., cosine and sine) component having a frequency $$\frac{\omega_{IF} - \Delta\omega}{2\pi},$$

where $$\frac{\Delta\omega}{2\pi}$$

is the frequency of the approximate detuning from the intermediate frequency $$\frac{\omega_{IF}}{2\pi}.$$

Signals from the fifth and sixth multipliers 40, 41 comes, respectively, through first and second filters 42, 43 to first and second analog-to-digital converters (ADCs) 44, 45, respectively. Each of the ADCs 44, 45 is configured for converting the cosine and sine components of the received signal into corresponding digital samples with the frequency $C_1 \cdot f_1'$ obtained from the clock frequency $f_1'$ of the receiving side, which clock frequency is extracted in the clock frequency extractor 38. Finally, signals from the ADCs 44, 45 come to a digital quadrature demodulator 46 performing the demodulation of the signals of the in-phase (I) and quadrature (Q) channels of the receiving side. The embodiment of the digital quadrature demodulator 46 will be shown below.

First and second optimal digital filters 27 and 28 are configured for optimal digital filtering the signals from corresponding outputs of the digital quadrature demodulator 46 in the digital quadrature demodulation unit 26. This filtering step is performed with the clock frequency $C_1 \cdot f_1'$. It should be noted that the amplitude-frequency characteristic of those optimal digital filters 27 and 28 has the cutoff frequency equal to the Nyquist frequency, as in the digital filters 14 and 15 of the transmitting side.

First and second units 29 and 30 of the convolution with the first PRS are configured for convolving the signals from the first and second optimal digital filters 27 and 28, respectively, with the first PRS used at the transmitting side and known at the receiving side. First and second units 31 and 32 for convolution with the second PRS are configured for convolving the signals from the first and second optimal digital filters 27 and 28, respectively, with the second PRS, also used at the transmitting side and known at the receiving side.

Each of first and second converters 33 and 34 into m-level sequence is configured for forming a sequence of m-level samples from signals of the first and second units 29 and 30 of the convolution with the first PRS, respectively.

A sequence combining unit 35 is configured for combining the signals from the first and second converters 33, 34 into m-level sequence into one sequence of the m-level samples, which is an output signal 39 of the receiving side.

A first frequency adjustment extractor 36 is configured for forming a frequency adjustment signal for the clock frequency extractor 38 from the signals of the first and second units 29, 30 of the convolution with the first PRS.

A second frequency adjustment extractor 37 is configured for forming a frequency adjustment signal for the digital quadrature demodulator 46 in the digital quadrature demodulation unit 26 from the signal of the first and second units 31, 32 for convolution with the second PRS.

Figure 4:
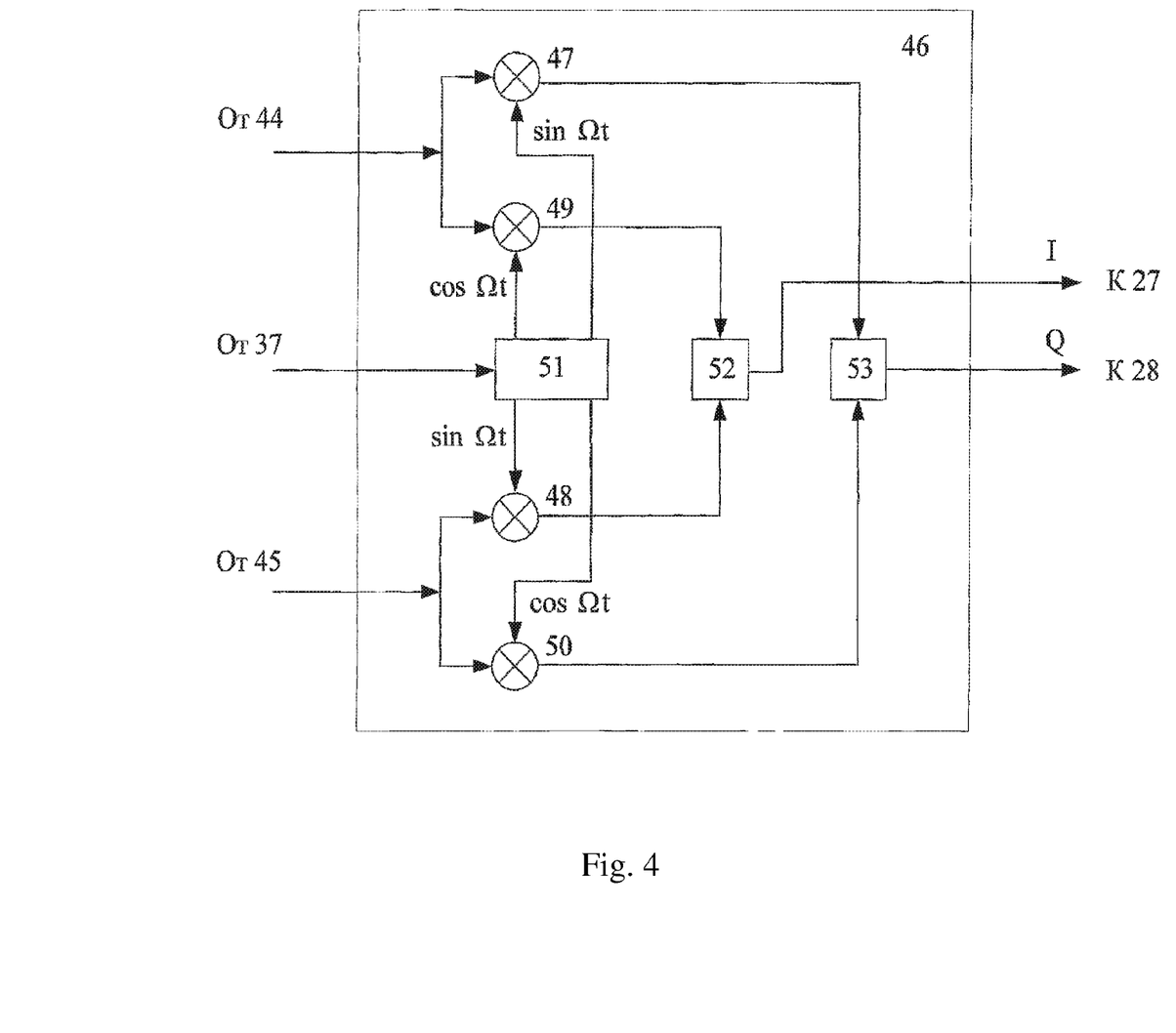
FIG. 4 illustrates an embodiment of the digital quadrature demodulator in the quadrature transform unit at the receiving side of the system according to the present invention.

The digital quadrature demodulator 46 in the digital quadrature demodulation unit 26 is built in accordance with the diagram shown in FIG. 4. The digital quadrature demodulator 46 comprises a seventh and eighth multipliers 47 and 48, each configured for multiplying the sine component of the input signal by the corresponding quadrature component of the frequency $$\frac{\Delta\omega}{2\pi},$$

and a ninth and tenth multipliers 49 and 50 each configured for multiplying the cosine component of the input signal by the corresponding quadrature component of the frequency $$\frac{\Delta\omega}{2\pi}.$$

The components of the frequency $$\frac{\Delta\omega}{2\pi}$$

are generated under the control of a controllable frequency synthesizer 51. The digital quadrature demodulator 46 includes also a first subtractor 52 configured for subtracting the signals from the eighth and ninth multipliers 48, 49, and a third adder 53 configured for summing the signals from the seventh and tenth multipliers 47, 50. Signals from the outputs of the first subtractor 52 and third adder 53 are the signals of the in-phase (I) and quadrature (Q) channels of the receiving side.

Figure 5:
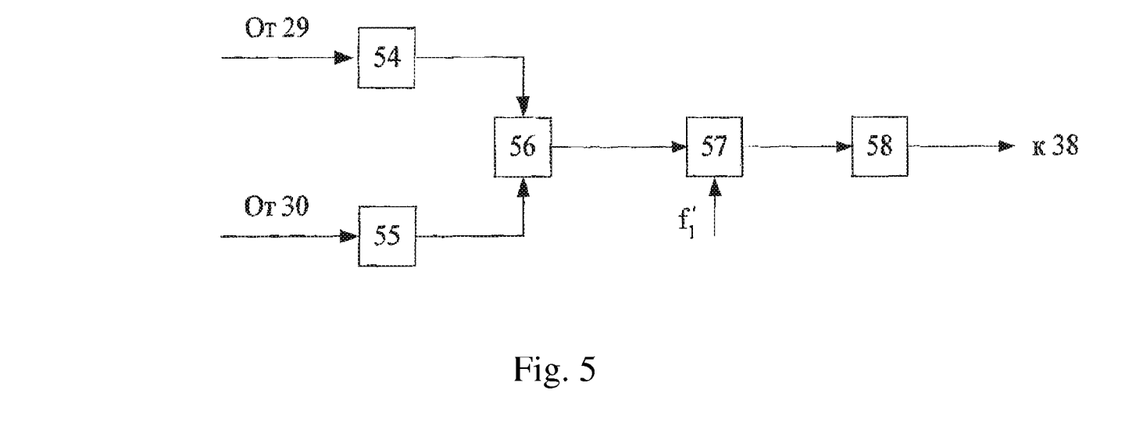
FIG. 5 is the block diagram of the first frequency adjustment extractor at the receiving side of the system according to the present invention.

The first frequency adjustment extractor 36 (FIG. 5) comprises: first and second absolute magnitude calculators 54, 55 configured for calculating the absolute magnitude of the signals from the first and second units 29, 30 of the convolution with the first PRS, respectively; a fourth adder 56 configured for summing the signals from the first and second absolute magnitude calculators 54, 55; a first phase detector 57 configured for comparing in phase the signal of the fourth adder 56 with a reference signal $\cos(\pi f_1' t)$ having the frequency $f_1'$ and being supplied from the first output of the clock frequency extractor 38; a first loop filter 58 connected in a clock frequency adjustment loop and configured for filtering a result of the comparison from the first phase detector 57 and for forming the frequency adjustment signal for the clock frequency extractor 38.

Figure 6:
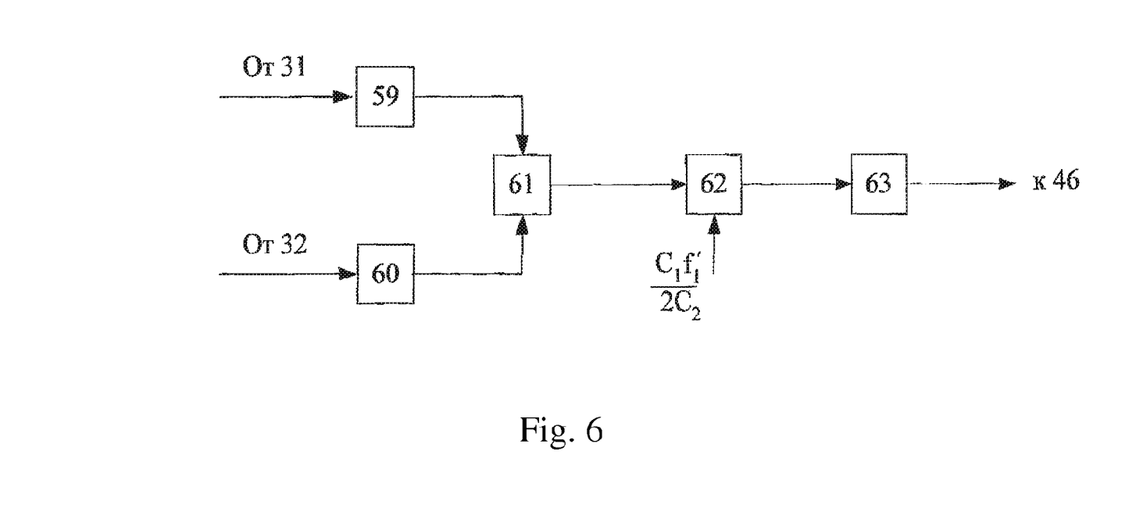
FIG. 6 is the block diagram of the second frequency adjustment extractor at the receiving side of the system according to the present invention.

The second frequency adjustment extractor 37 (FIG. 6) comprises: first and second convolutional signal converters 59, 60 configured for converting the convolutional signal, respectively, from the first and second units 31, 32 for convolution with the second PRS into the meander signal; a third subtractor 61 configured for subtracting the signals of the first and second convolutional signal converters 59, 60; a second phase detector 62 configured for comparing in phase the signal of the third subtractor 61 with the reference signal $$\cos\left(\pi \frac{C_1 \cdot f_1'}{2C_2} t\right)$$

having a frequency $$\frac{C_1 \cdot f_1'}{2C_2}$$

and being supplied from the second output of the clock frequency extractor 38; a second loop filter connected in the clock frequency adjustment loop and configured for filtering a result of the comparison from the second phase detector 62 and for forming the frequency adjustment signal for the digital quadrature demodulator 46 in the digital quadrature demodulation unit 26.

The clock frequency extractor 38 comprises a phase-locked-loop (PLL) unit configured for receiving the signal from the first frequency adjustment extractor 36 and for supplying signals $\cos(\pi f_1' t)$ and $$\cos\left(\pi \frac{C_1 \cdot f_1'}{2C_2} t\right).$$

Moreover, the clock frequency extractor 38 comprises respective frequency dividers for forming the signals having the following clock frequencies: $C_1 \cdot f_1'$ at the third output for clocking the ADCs 44 and 45 in the digital quadrature demodulation unit 26, optimal digital filters 27 and 28, units 29 and 30 of the convolution with the first PRS, and units 31 and 32 for convolution with the second PRS; $f_1'/2$ at the fourth output for clocking the converters 33 and 34 into the m-level sequence; $kf_1'/2$ at the fifth output and $kf_1'$ at the sixth output for clocking the sequence combining unit 35.

The PLL unit in the clock frequency extractor 38 could be made in accordance with any known circuit.

The method for transmitting and receiving QAM signals according to the present invention in implemented in the shown system as follows.

An initial bit sequence 1 (FIG. 2) having the frequency $kf_1$ $$\cos\left(\pi \frac{C_1 \cdot f_1'}{2C_2} t\right)$$

comes to the information input of the m-level symbol former 3, which converts this bit (i.e., binary) sequence into the m-level symbol sequence, where $m=2^k$, $k=2, 3, \ldots$, which m-level symbols coming out at the first clock frequency $f_1$. In principle, the former 3 is not required is the initial sequence is just the m-level symbols sequence. The first clock frequency is generated in the clock frequency former 4 of the transmitting side at the first output thereof from the signal 2 having the clock frequency $kf_1$ coming to the input of the former 4. In the case where the initial sequence is the m-level symbol sequence, the first clock frequency $f_1$ comes directly from the input. Then the additional frequency multiplication should be provided for in the clock frequency former 4.

The obtained m-level symbol sequence from the former 3 comes to the channel divider 5, where this sequence is divided into the I channel of the transmitting side having the even m-level symbols and the Q channel of the transmitting side having the odd m-level symbols. The repetition frequency of the m-level symbols in each of the I and Q channels of the transmitting side being equal to $f_1/2$. The corresponding clock signal is formed at the second output of the clock frequency former 4.

In the first and second multipliers 6 and 7, the step of enlarging the spectrum of the coming m-level sequences by means of multiplying thereof by the first PRS supplied from the first PRS former 8. Then, the obtained signals are summed in the first and second adders 9 and 10, respectively, with the second PRS formed in the second PRS former 12 and manipulated in the manipulator 11 with the meander signal from the meander signal former 13. Since, as noted above, the first PRS has the zero even members and the second PRS has the zero odd members, no undesired interaction occurs between the components of the first and second PRS when summing in the adders 9 and 10.

The signals from the outputs of the first and second adders 9 and 10 comes to the digital filters 14 and 15, respectively, where the step of filtering these signals by the Nyquist criterion, or the matched filtering is carried out whereafter these signals are translated into the analog form in the first and second DACs 16 and 17, respectively, and supplied to the transmission signal former 19. In the transmission signal former 19, the analog signals from the outputs of the first and second DACs 16 and 17 comes<respectively, to the third and fourth multipliers 20 and 21, where each of those analog signals is multiplied by the corresponding quadrature component of the carrier frequency signal (i.e., by the $\cos \omega_0 t$ and $\sin \omega_0 t$). The results of these multiplications are fed to the summing unit 22, from which output the transmission signal 23 is supplied into the communication channel (not shown).

At the receiving side (FIG. 3), the signal 24 from the communication channel comes to input of the unit 25 for transferring to the IF, where this signal is amplified, filtered and transferred to the intermediate frequency $$\frac{\omega_{IF}}{2\pi}.$$

From the unit 25 for transferring to the IF the signal comes to the digital quadrature demodulation unit 26.

In this unit 26, the incoming signal is supplied to one of the inputs of each of fifth and sixth multipliers 40, 41, and another input of each of these multipliers 40, 41 is supplied with the cosine or sine components of the signal having the frequency $$\frac{\omega_{IF} - \Delta\omega}{2\pi},$$

where $$\frac{\Delta\omega}{2\pi}$$

is the frequency of the approximate detuning from the intermediate frequency $$\frac{\omega_{IF}}{2\pi}.$$

Signals from the fifth and sixth multipliers 40, 41 comes, respectively, through the first and second filters 42, 43 to the first and second analog-to-digital converters (ADCs) 44, 45, respectively, where the cosine and sine components of the received signal are converted into the corresponding digital samples. The signals from the ADCs 44, 45 come to the digital quadrature demodulator 46 performing the demodulation of the signals of the in-phase (I) and quadrature (Q) channels of the receiving side.

In the digital quadrature demodulator 46, the signal from the first ADC 44 comes to the first inputs of the seventh and ninth multipliers 47, 49, and the signal from the second ADC 45 comes to the first inputs of the eighth and tenth multipliers 48, 50. The controllable frequency synthesizer 51 produces the signal $$\sin\frac{\Delta\omega}{2\pi}$$

to the second inputs of the seventh and eighth multipliers 47, 48 and the signal $$\cos\frac{\Delta\omega}{2\pi}$$

to the second inputs of the ninth and tenth multipliers 49, 50. The signals from the outputs of the eighth and ninth multipliers 48, 49 are supplied to the first subtractor 52, from which output the signal of the in-phase (I) channel of the receiving side is output. The signals from the outputs of the seventh and tenth multipliers 47, 50 are supplied to the inputs of the third adder 53, from which output the signal of the quadrature (Q) channel of the receiving side is output.

The I and Q channel signals come (FIG. 2), respectively, to the first and second optimal digital filters 27 and 28, where these signals are subjected to the optimal filtration, as described for the transmitting side. The signal from the output of the first optimal digital filter 27 is supplied to the first unit 29 of the convolution with the first PRS and to the first unit 31 of the convolution with the second PRS, and the signal from the second optimal digital filter 28 is supplied to the second unit 30 of the convolution with the first PRS and to the second unit 32 of the convolution with the second PRS. These convolution operations are carried out by means of the matched filtering with the first PRS. As a result, the signals are extracted at the output of the units 29, 30 of the convolution with the first PRS, the spectrum of which signals being compressed in comparison with the spectrum enlarged at the transmitting side using the first PRS. In other words, the m-level symbol sequences transmitted from the transmitting side are extracted at the outputs of the units 29 and 30 of the convolution with the first PRS. Similarly, the signals having the compressed spectrum are extracted at the outputs of the units 31, 32 of the convolution with the second PRS.

The m-level symbol sequences from the units 29, 30 of the convolution with the first PRS come to the units 33, 34, where they are converted into the k-bit code combinations, which are supplied after the step of combining in the combining sequence unit 35 in the form of the single sequence 39 to the output of the receiving side.

At the same time, the m-level symbol sequences from the units 29, 30 of the convolution with the first PRS come to the first frequency adjustment extractor 36.

In this unit 36 (FIG. 5), the incoming signals come, respectively, to the first and second absolute magnitude calculators 54, 55, where the absolute magnitude of each m-level symbol is determined. These signals are summed in the fourth adder 56, which signal is supplied to the first input of the first phase detector 57, which another input is fed with the signal having the frequency $f_1'$ from the clock frequency extractor 38. After the step of filtering in the first loop filter 58, the extracted frequency adjustment signal is supplied to the clock frequency extractor 38 for tracking by the PLL system.

The m-level symbol sequences from the units 31, 32 of the convolution with the second PRS come to the second frequency adjustment extractor 37.

In this unit 37 (FIG. 6), the incoming signals come to the first inputs of the first and second convolutional signal converters 59, 60, respectively, where the signal from the output of the corresponding unit 31, 32 of the convolution with the second PRS is converted into the meander signal. The obtained signal are subtracted in the third subtractor 61, and the resulting signal is supplied to the first input of the second phase detector 62, which second input is fed with the signal having the frequency $C_1 \cdot f_1/2C_2$. The resulting signal, after the step of filtering in the second loop filter 63, comes to the digital quadrature demodulator 46 of the digital quadrature demodulation unit 26 for adjusting the controllable frequency synthesizer 51.

Thus, the meander signal is obtained at the output of the second frequency extractor 37, and the values of the second PRS are inverted with cycle of that meander signal.

Those skilled in the art will appreciate that all steps of the method for transmitting and receiving QAM signals according to the present invention could be entirely implemented not in a hardware embodiment, but also in a software embodiment, since the signal being processed is already sampled, digitized and translated into the form of bit samples. These samples will be processed by the computer processor in accordance with a program, which algorithm is practically described above. In this case, the program corresponding to the implementation of the foregoing operation algorithm, by which execution in the computer the method of the present invention could be realized, can be recorded to the machine-readable medium intended for the direct operation as a part of the computer.

Moreover, the method of the present invention could be purposefully used not for transmitting the information using QAM signals, but only for synchronizing the reception of quadrature-amplitude modulation signals at the time interval $$T = \frac{2kM}{f_1}.$$

Therefore, all indicated possibilities are included in the form of separate aspects into the appended claims fully defining the scope of the present invention taking into account any equivalent features used in those claims. The specification serves only the purposes for illustrating and explaining the principles rather than for limiting the scope of the present invention.

While this invention has been particularly shown and described with references to preferred embodiments thereof, it will be understood by those skilled in the art that various changes in form and details may be made therein without departing from the scope of the invention encompassed by the appended claims.

What is claimed is:

1. A method for transmitting and receiving quadrature-amplitude modulation (QAM) signals, the method including steps of:
   at a transmitting side:
   a) dividing an information sequence of m-level symbols, where $m=2^k$, wherein k is an integer number from 2 to 12, which m-level symbols having the first clock frequency $f_1$, into the I channel of the transmitting side with the even m-level symbols and Q channel of the transmitting side with the odd m-level symbols, the m-level symbols in each of the I and Q channels of the transmitting side having a repetition frequency $f_1/2$;

b) enlarging a spectrum of each of the m-level symbols in each of the I and Q channels of the transmitting side by multiplying each m-level symbol with a first pseudo-random sequence (PRS) having a time base $C_1$ and a repetition frequency $C_1 \cdot f_1/2$, every odd member of said first PRS having a value +1 or −1, and all even members of said first PRS being equal to 0;

c) manipulating a second PRS having a second time base $C_2 > C_1$ and the same repetition frequency $C_1 \cdot f_1/2$ as said first PRS with a meander signal having a cycle twice as big as the cycle of said second PRS, every even member of said second PRS having a value +A or −A, and all odd members of said second PRS being equal to 0;

d) summing the signal obtained in the steps b) and c) in each of the I and Q channels of the transmitting side;

e) subjecting the summed signals in each of the I and Q channels of the transmitting side to a digital filtration at a frequency $C_1 \cdot f_1$;

f) converting the filtered signals in each of the I and Q channels of the transmitting side into analog signals;

g) forming a transmission signal using said analog signals by multiplying the analog signal in the I channel of the transmitting side by a cosine component of the carrier signal and by multiplying the analog signal in the Q channel of the transmitting side by a sine component of the carrier signal;

at a receiving side:

h) transferring a received signal to an intermediate frequency $$\frac{\omega_{IF}}{2\pi};$$

i) performing a primary quadrature transformation of the received signal by multiplying the signal at the intermediate frequency by signals $\sin(\omega_{IF}-\Omega)t$ and $\cos(\omega_{IF}-\Omega)t$, respectively, where $$\frac{\Omega}{2\pi}$$

is a frequency of the approximate detuning from the intermediate frequency $$\frac{\omega_{IF}}{2\pi},$$

and thus forming first and second signals of the primary quadrature transformation;

j) digitizing each of the first and second signals of the primary quadrature transformation;

k) subjecting the digitized signals to a secondary quadrature transformation by multiplying the digitized first signal of the primary quadrature transformation by a signal $\cos \Omega t$, and the digitized second signal of the primary quadrature transformation by a signal $\sin \Omega t$, thus forming, respectively, first and second signals of the secondary quadrature transformation;

l) subjecting the signals obtained in the step k) to a digital filtration at a frequency approximately equals to the $C_1 \cdot f_1$, thus forming a signals of I channel and Q channel of the receiving side from, respectively, the first and second signals of the secondary quadrature transformation;

m) performing a matched filtration of each of the signals obtained in the step l) by both the first PRS and second PRS, thus obtaining a corresponding convolutions of these signals, the signal convolutions with the first PRS being adopted as the initial m-level sequences transmitted at the transmitting side;

n) converting the signal convolutions with the second PRS into a rectangular meander pulses having a cycle approximately twice as big as the cycle of the second PRS;

o) subtracting the rectangular pulses of the Q channel of the receiving side from the rectangular pulses of the I channel of the receiving side;

p) comparing in phase the difference obtained in the step o) with a reference meander signal having a repetition frequency $$\frac{C_1 \cdot f_1'}{2C_2}$$

obtained from the clock frequency $f_1'$ of the receiving side and approximately equal to the frequency $kf_1'$;

r) adjusting the frequency $$\frac{\Omega}{2\pi}$$

with the signal obtained as a result in the step p);

s) at the same time, summing the absolute magnitudes of the signal convolutions with the first PRS from the I and Q channels of the receiving side;

t) comparing in phase the result of summing in the step s) with a reference signal $\cos(\pi f_1 t)$ and using the result of this comparing for adjusting the value of the digitizing frequency of the signals in the I and Q channels of the receiving side.

2. The method according to claim 1, wherein at the transmitting side, before said step a), said information sequence of the m-level symbols is created by converting an information sequence of bit symbols having a repetition frequency $f_b = kf_1$, and at the receiving side, the signal convolutions with the first PRS are placed in correspondence with k-bit combinations, which are then combined into a single bit stream by reading these combinations alternatively from the I and Q channels of the receiving side.

3. A system for transmitting and receiving quadrature-amplitude modulation signals, the system comprising:

at a transmitting side:

a channel divider configured for dividing an information sequence of m-level symbols, where $m=2^k$, wherein k is an integer number from 2 to 12, which m-level symbols having the first clock frequency $f_1$, into the I channel of the transmitting side with the even m-level symbols and Q channel of the transmitting side with the odd m-level symbols, the m-level symbols in each of the I and Q channels of the transmitting side having a repetition frequency $f_1/2$;

a first pseudo-random sequence (PRS) former configured for forming the first PRS having a time base $C_1$ and a repetition frequency $C_1 \cdot f_1/2$, every odd member of said first PRS having a value +1 or −1, and all even members of said first PRS being equal to 0;

first and second multipliers configured for enlarging a spectrum of each of the m-level symbols in each of the I and Q channels of the transmitting side by multiplying each m-level symbol with said first PRS;

a second PRS former configured for forming the second PRS having a second time base $C_2 > C_1$ and the same repetition frequency $C_1 \cdot f_1/2$ as said first PRS with a meander signal having a cycle twice as big as the cycle of said second PRS, every even member of said second PRS having a value +A or −A, and all odd members of said second PRS being equal to 0;

a meander signal former configured for forming the meander signal having cycle being twice as big as the cycle of said second PRS;

a manipulator configured for manipulating said second PRS with said meander signal;

first and second adders configured for summing the signals from, respectively, the first and second multipliers with the signal of said manipulator;

first and second digital filters configured for digital filtering, at the frequency $C_1 \cdot f_1$, the signals of, respectively, the first and second adders;

first and second digital-to-analog converters (DACs) configured for converting the signals of said respective digital filters into analog signals;

a transmission signal former configured for forming the transmission signal from the signals of said DACs;

a clock frequency former configured for forming all clock frequencies necessary for operating the transmitting side units from the first clock frequency;

at a receiving side:

a clock frequency extractor configured for extracting the clock frequencies using the signals in I and Q channels of the receiving side;

a digital quadrature demodulation unit configured for dividing the received signal into the signals of the I channel of the receiving side and Q channel of the receiving side, and for performing the quadrature-amplitude demodulation of these signals;

first and second optimal digital filters configured for optimal digital filtering, at the frequency $C_1 \cdot f_1$, said signals from the digital quadrature demodulation unit;

first and second units of the convolution with the first PRS configured for convolving the signals from the respective optimal digital filters by performing the matched filtration with said first PRS;

first and second units of the convolution with the second PRS configured for convolving the signals from the respective optimal digital filters by performing the matched filtration with said second PRS;

a first frequency adjustment extractor configured for forming the frequency adjustment signal from the signals of said first and second units of the convolution with the first PRS for said clock frequency extractor;

a second frequency adjustment extractor configured for forming the frequency adjustment signal from the signals of said first and second units of the convolution with the second PRS for said digital quadrature demodulation unit;

first and second converters into m-level sequence, each of which being configured for forming the sequence of the m-level samples from the signals of said first and second units of the convolution with the first PRS;

a sequence combining unit configured for combining the signals of said first and second converters into m-level sequence into a single sequence of m-level samples having the repetition frequency $f_1$.

4. The system according to claim 3, wherein, at the transmitting side, prior to said channel divider, a m-level sample former configured for converting the initial information sequence of bit symbols coming at the frequency $kf_1$ into said m-level symbol sequence is connected.

5. The system according to claim 3, wherein, at the transmitting side, said transmission signal former comprises a third and fourth multipliers each configured for multiplying the signals from, respectively, the first and second DACs by a corresponding quadrature component, and a summing unit configured for summing the results of multiplication of said third and fourth multipliers.

6. The system according to claim 3, wherein, at the receiving side, after said sequence combining unit, a converter into bit sequence configured for converting the combined sequence of m-level samples from said sequence combining unit into the information sequence of bit symbols having a clock frequency $kf_1$.

7. The system according to claim 3, wherein, at the receiving side, the digital quadrature demodulation unit comprises:

a fifth and sixth multipliers, each being configured for multiplying the input signal by a corresponding quadrature component of a frequency $$\frac{\omega_{IF} - \Delta\omega}{2\pi},$$

where $$\frac{\Delta\omega}{2\pi}$$

is the frequency of the approximate detuning from the intermediate frequency $$\frac{\omega_{IF}}{2\pi};$$

first and second filters, each being configured for extracting the signals of the fifth and sixth multipliers, respectively, and for forming, respectively, a cosine and sine components of the received signal;

first and second analog-to-digital converters (ADCs) configured for converting said cosine and sine components of the received signal into corresponding digital samples having a frequency $C_1 \cdot f_1'$ obtained from the clock frequency $f_1'$ of the receiving side;

a digital quadrature demodulator configured for demodulating the signals of the on-phase and quadrature channels.

8. The system according to claim 7, wherein, at the receiving side, the digital quadrature demodulator comprises:

a seventh and eighth multipliers, each configured for multiplying the sine component of the input signal by a corresponding quadrature component of the frequency $$\frac{\Delta\omega}{2\pi};$$

a ninth and tenth multipliers, each configured for multiplying the cosine component of the input signal by a corresponding quadrature component of the frequency $$\frac{\Delta\omega}{2\pi};$$

a controllable frequency synthesizer forming, from the intermediate frequency detuning signal, the sine component of the frequency $$\frac{\Delta\omega}{2\pi}$$

for supplying thereof to the seventh and ninth multipliers, and the cosine component of the frequency $$\frac{\Delta\omega}{2\pi}$$

for supplying thereof to the eighth and tenth multipliers;
a subtractor configured for subtracting the signals of the eighth and ninth multipliers;
an adder configured for summing the signals of the seventh and tenth multipliers.

9. The system according to claim 3, wherein the first frequency adjustment extractor comprises:
first and second absolute magnitude calculators configured for calculating the absolute magnitude of the signals from the respective units of the convolution with the first PRS;
a fourth adder configured for summing the signals of said absolute magnitude calculators;
a first phase detector configured for comparing in phase the signal from the fourth adder with a reference signal $\cos(\pi f_1' t)$;

a first loop filter configured for filtering the comparison result of said first phase detector and for forming said frequency adjustment signal for said clock frequency extractor.

10. The system according to claim 3, wherein the second frequency adjustment extractor comprises:
first and second convolution code converters configured for converting the convolution signal of the respective unit of the convolution with the second PRS into a meander signal;
a third subtractor configured for subtracting the signals of the first and second convolution code converters;
a second phase detector configured for comparing in phase the signal from the third subtractor with a reference signal $$\cos\left(\pi \frac{C_1 \cdot f_1'}{2C_2} t\right);$$

a second loop filter configured for filtering the comparison result of said second phase detector and for forming said frequency adjustment signal for said digital quadrature demodulation unit.

11. A machine-readable medium intended for a direct operation within a computer and comprising a program for performing the method according to claim 1.

12. A use of the method according to claim 1 for synchronizing the reception of quadrature-amplitude modulation (QAM) signals at the time interval $$T = \frac{2kM}{f_1}.$$

* * * * *